No. 794,538. PATENTED JULY 11, 1905.
E. J. NOLTING.
HEDGE TRIMMER.
APPLICATION FILED NOV. 19, 1904.

2 SHEETS—SHEET 1.

Witnesses
E. K. Reichenbach
E. M. Colford

Inventor
E. J. Nolting
by
Chandler & Chandler
Attorneys

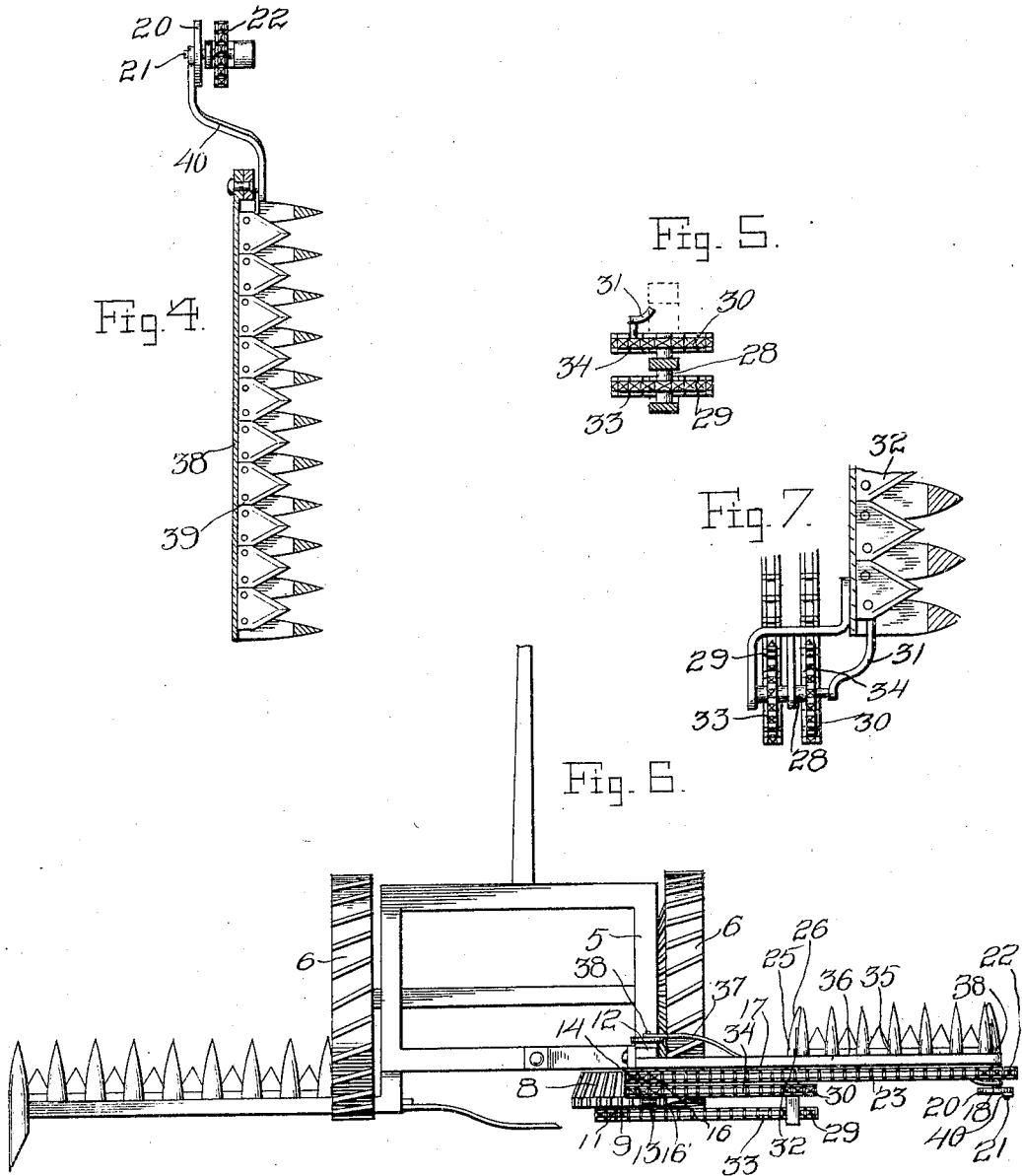

No. 794,538. Patented July 11, 1905.

UNITED STATES PATENT OFFICE.

ERNEST J. NOLTING, OF NORTH TOPEKA, KANSAS.

HEDGE-TRIMMER.

SPECIFICATION forming part of Letters Patent No. 794,538, dated July 11, 1905.

Application filed November 19, 1904. Serial No. 233,458.

*To all whom it may concern:*

Be it known that I, ERNEST J. NOLTING, a citizen of the United States, residing at North Topeka, in the county of Shawnee, State of Kansas, have invented certain new and useful Improvements in Hedge-Trimmers; and I do hereby declare the following to be a full, clear, and exact description of the invention, such as will enable others skilled in the art to which it appertains to make and use the same.

This invention relates to hedge-trimmers, and has for its object to provide a machine for this purpose which will receive its motive power from the ground-wheels and which will trim all the faces of the hedge at once.

Figure 1:
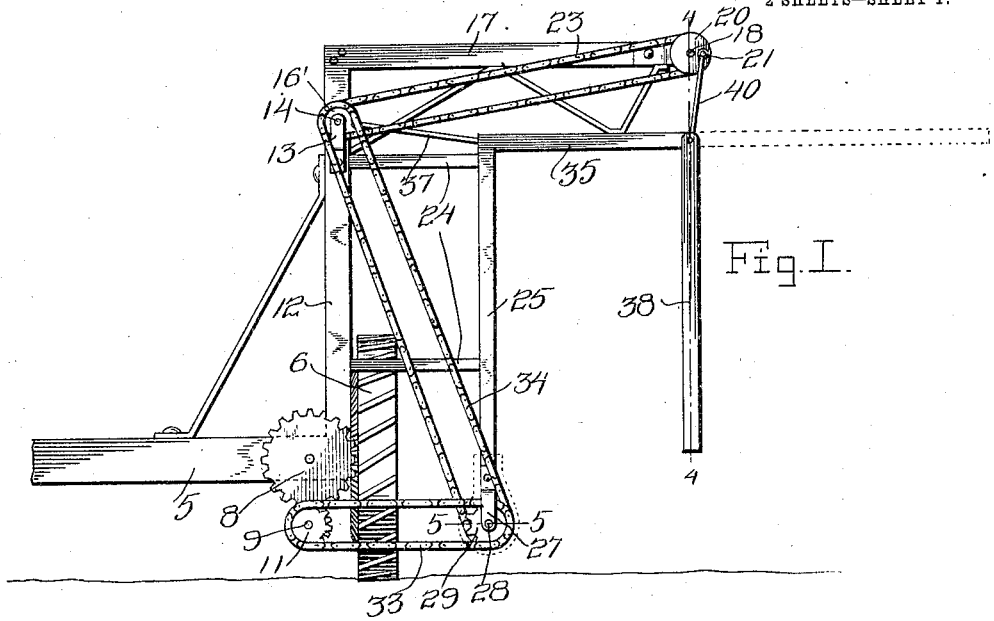
Figure 2:
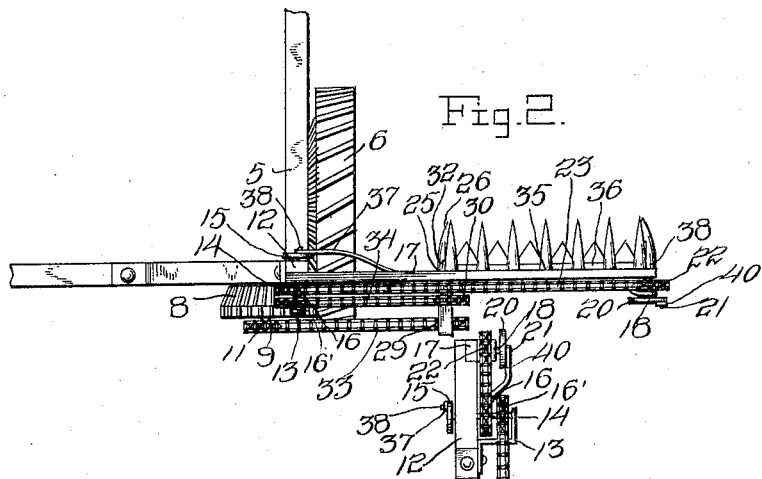
Figure 3:
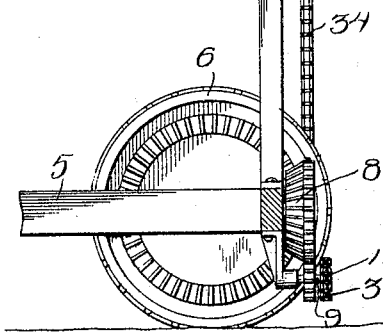

In the drawings forming a portion of this specification, and in which like numerals of reference indicate similar parts in the several views, Figure 1 is a rear view of the machine. Fig. 2 is a top plan view of Fig. 1. Fig. 3 is a side elevation of the machine at the opposite side from the cutting mechanism. Fig. 4 is a detail sectional view taken on line 4 4 of Fig. 1. Fig. 5 is a detail sectional view on line 5 5 of Fig. 1. Fig. 6 is a view showing the hedge-trimming mechanism arranged for connection to different mowing-machines and showing a machine to which it is attached. Fig. 7 is a detail view of the inner vertical cutter-bar.

Referring now to the drawings, there is shown a frame 5, having ground-wheels 6, with one of which there is connected, by means of suitable gearing 8, a shaft 9, which extends forwardly at right angles to the axle 10 of the machine and which carries a sprocket 11.

Extending upwardly from the frame 5 is an upright 12, having a bracket 13 thereon, in which there is revolubly mounted a shaft 14, which extends at one end beyond the upright and has mounted thereon a disk 15, a pair of sprocket-wheels 16 and 16' being mounted upon the shaft between the bracket and the upright.

Above the bracket just described the upright has attached thereto one end of an outwardly-extending arm 17, having a shaft 18 at its outer end, which projects beyond the rearward face of the upright and has mounted thereon a disk 20, having an eccentrically-mounted pin 21 upon its outer face. Upon the shaft 18 there is also a sprocket-wheel 22, which is connected, by means of a chain 23, with the sprocket 16.

Connected by suitable braces 24 with the upright 12 there is a finger-bar 25, similar to the finger-bars used on mowing-machines, and this finger-bar is disposed parallel to the upright, with its fingers 26 directed toward the forward end of the machine. A bearing-bracket 27 depends from the lower end of the finger-bar and has mounted therein a shaft 28, which carries sprocket-wheels 29 and 30, the sprocket 30 having eccentrically pivoted to its outer face the lower end of a pitman 31, the upper end of which is connected to a sickle-bar 32, which is slidably disposed in the finger-bar 25. A chain 33 connects the sprocket 29 with the sprocket 11, and the sprockets 30 and 16' are connected by a similar chain 34.

Extending outwardly at right angles from the upper end of the finger-bar 25 is a similar finger-bar 35, having disposed therein a sickle-bar 36, which is connected, by means of a pitman 37, to a pin 38, eccentrically mounted upon the disk 15. Pivotally connected with the outer end of the finger-bar 35 and depending therefrom is a third finger-bar 38, its pivotal mounting permitting of upward movement of its lower end, and in this finger-bar there is disposed a sickle-bar 39, which is pivotally connected to the lower end of a pitman 40, the upper end of which is pivoted upon the pin 21 of the disk 20. It will thus be seen that cutter-bars are disposed at three sides of a rectangle, and by raising the bar 39 the machine may be driven up to a hedge and the bar 35 engaged thereover, after which the bar 39 is lowered and lies against one side of the hedge, the bar 25 lying against the opposite side, and if the machine be now driven over the ground the movement of the ground-wheel 6 will be communicated through the mechanism described above to the sickle-bars, which will operate to trim the hedge.

In practice modifications of the specific construction shown may be made, and any suitable materials and proportions may be used for the various parts without departing from the spirit of the invention.

In Fig. 6 there is shown a modification in which the hedge-trimming mechanism is detachably connected with the mowing-machine. In this form of the invention the shaft 9 is the usual counter-shaft of the machine which operates the cutter-bar; but the customary eccentric disk is removed and replaced by the gear 11. The upright 12 is detachably connected with the mower by means of suitable bolts. The remainder of the mechanism is the same as that set forth in the previously-described forms.

What is claimed is—

1. A hedge-trimmer comprising a frame having ground-wheels, a vertically-extending cutter-bar connected with the frame, a shaft journaled at the lower end of said cutter-bar, connections between said shaft and one of the ground-wheels for operation of the shaft through movement of the ground-wheel, a shaft journaled in the frame above the first-mentioned shaft, connections between the two shafts for simultaneous operation, a third shaft journaled in the frame outwardly of the previously-mentioned shafts, connections between the second and third shafts for simultaneous operation, a cutter-bar extending outwardly from the upper end of the first-named cutter-bar, connections between said second cutter-bar and the second shaft for operation of the cutter-bar, a third cutter-bar pivoted to the outer end of the second cutter-bar for vertical movement, and connections between said cutter-bar and the third shaft for operation of the cutter-bar.

2. A hedge-trimmer comprising a vertical cutter-bar, a cutter-bar extending at right angles to the first-mentioned cutter-bar at the upper end thereof, means for operating the cutter-bars, a finger-bar pivoted to the outer end of the second-named cutter-bar for vertical movement, a sickle-bar slidably mounted in said finger-bar, a shaft revolubly mounted above the finger-bar, a pitman eccentrically connected with the shaft at one end and pivoted at its opposite end to the upper end of the sickle-bar for vertical movement of the free end of the sickle-bar, and means for operating the shaft to operate the sickle-bar.

In testimony whereof I affix my signature in presence of two witnesses.

ERNEST J. NOLTING.

Witnesses:
W. I. JAMISON,
M. F. LAYCOCK.